(12) United States Patent
Onoe et al.

(10) Patent No.: US 6,841,220 B2
(45) Date of Patent: Jan. 11, 2005

(54) DIELECTRIC RECORDING MEDIUM, AND METHOD OF AND APPARATUS FOR PRODUCING THE SAME

(75) Inventors: Atsushi Onoe, Saitama (JP); Yasuo Cho, 4-5-304, Komegafukuro 2-chome, Aoba-ku, Sendai-shi, Miyagi (JP)

(73) Assignees: Pioneer Corporation, Tokyo (JP); Yasuo Cho, Sendai (JP)

( * ) Notice: Subject to any disclaimer, the term of this patent is extended or adjusted under 35 U.S.C. 154(b) by 0 days.

(21) Appl. No.: 10/396,708

(22) Filed: Mar. 26, 2003

(65) Prior Publication Data

US 2003/0186090 A1 Oct. 2, 2003

(30) Foreign Application Priority Data

Mar. 26, 2002 (JP) ........................................ 2002-086576

(51) Int. Cl.[7] ................................................. B32B 3/02
(52) U.S. Cl. .................... 428/66.7; 428/64.4; 428/65.2; 428/65.3; 428/192
(58) Field of Search ............................. 428/64.4, 65.2, 428/65.3, 192, 66.7, 432

(56) References Cited

U.S. PATENT DOCUMENTS 5,985,404 A * 11/1999 Yano et al. ................. 428/65.3
6,096,434 A * 8/2000 Yano et al. ................. 428/446

* cited by examiner

Primary Examiner—Cathy Lam
(74) Attorney, Agent, or Firm—Nixon & Vanderhye P.C.

(57) ABSTRACT

The dielectric recording medium is provided with a dielectric material, a conductive thin film, and a substrate. The conductive thin film and the substrate are bonded by a resin adhesive. The dielectric material is constructed of a ferroelectric single crystal having a uniform thickness, and its one surface is used for a recording and/or reproducing surface, on the order of mm on a side and about 5000 Å thick. The conductive thin film, about 1000 to 2000 Å thick, is placed on a surrounding portion and a back surface of the recording and/or reproducing surface of the dielectric material. The substrate is intended to preserve the thin dielectric material and maintain the planarity, and concave portions are formed on the adhesive surface. The concave portions absorb excessive resin adhesive when the dielectric material is bonded onto the substrate, which makes the adhesive surface uniform and flat.

14 Claims, 12 Drawing Sheets

DIELECTRIC RECORDING MEDIUM, AND METHOD OF AND APPARATUS FOR PRODUCING THE SAME

BACKGROUND OF THE INVENTION

1. Field of the Invention

The present invention relates to a dielectric recording medium for recording information in a dielectric material, and a method of and an apparatus for producing the dielectric recording medium.

2. Description of the Related Art

Recently, many types of dielectric materials have been developed, and most of them are used for ultrasonic elements, optical elements, a memory and the like. In accordance with the fact, a method of measuring a spontaneous polarization distribution of the dielectric material and local anisotropy of the piezoelectric material has been developed. Also, by using this technique, techniques of recording information in the dielectric material and reproducing the information have been developed.

In order to record information in the dielectric material, a polarization direction of the polarization domain of the dielectric substance is formed such that the polarization direction corresponds to the information. For example, when using as a recording medium a ferroelectric bulk single crystal such as $LiTaO_3$, which has a 180-degree domain, the Z-cut single crystal is mechanically polished to prepare a thin film, and then, its back surface is applied onto a conductor substrate with a conductive paste to hold. The medium as formed above is used as a dielectric recording medium.

Alternatively, after the back surface of a crystal material of the dielectric substance is applied onto the conductor substrate with the conductive paste to hold, a thin crystal is formed by ion beam etching or the like from the side of the front surface. The medium as formed above is also used as the dielectric recording medium.

As described above, in order to record information in high density in a microdomain, it is necessary to form the recording medium as thin as possible, as well as to make the diameter of a probe for recording and/or reproducing small. Therefore, the mechanical polishing, the etching with ion beam and the like are conventionally used to prepare the thin film.

However, the method by the mechanical polishing is limited in thinning the medium with a thickness on the order of several $\mu m$, even using an angle polishing method of polishing a crystal with its back surface inclined slightly to the surface of a polishing apparatus. It is also difficult to make it thinner while keeping a stable form because the lack of crystal strength causes fracture.

Moreover, in order to polish the crystal to be in a predetermined thickness, it is necessary to measure the crystal thickness directly in the middle of polishing, as occasion demands. However, it takes a long time to measure it. Especially, in the case of treating a large crystal whose one side is on the order of mm, it is extremely difficult to polish all of the crystal surfaces in a uniform thickness to prepare the thin film.

SUMMARY OF THE INVENTION

It is therefore an object of the present invention to provide a dielectric recording medium having a recording device constructed by a single-crystal dielectric material appropriate for high-density recording, which is extremely thin and which is also large, for example, on the order of mm on a side, as well as a method of and an apparatus for producing the dielectric recording medium.

The above object of the present invention can be achieved by a dielectric recording medium for recording information in a dielectric material. The dielectric recording medium is provided with: a substrate; a dielectric material having a predetermined thickness and having a recording surface for recording the information thereon; and an electric conductor provided on at least a back surface of the dielectric material which is on the opposite side to the recording surface. In the dielectric recording medium, the back surface of the dielectric material on which the electric conductor is provided is bonded to a bonding surface of the substrate.

According to the dielectric recording medium of the present invention, the electric conductor is placed on the back surface of the dielectric material having a predetermined thickness. A predetermined electric potential is set in the electric conductor. For example, the electric conductor may be connected to the ground. When a probe abuts on the surface and a voltage is applied, a polarization domain is formed in the dielectric material on the basis of an electric field generated between the probe and the electric conductor, and thus, information is recorded.

The dielectric material is bonded to the bonding surface of the substrate through the electric conductor. Since the substrate is hard, even if the recording surface of the dielectric material is large and the thickness of the dielectric material is thin, the planarity of the recording surface can be ensured and mechanical strength of the dielectric material can be substantially obtained as well.

In one aspect of the dielectric recording medium of the present invention, the electric conductor covers the whole of the back surface and a side surface of the dielectric material, and an edge portion of the electric conductor is located at a peripheral portion of the recording surface of the dielectric material. Preferably, all of the side surface of the dielectric material may be covered with the electric conductor, and the peripheral portion of the recording surface of the dielectric material may be surrounded with the edge portion of the electric conductor.

According to this aspect, the edge portion of the electric conductor is located at the peripheral portion of the recording surface. The edge portion of the electric conductor is connected with the main body of the electric conductor covering the back surface of the dielectric material through the electric conductor covering a side surface of the dielectric material. Therefore, the same electric potential as that of the main body of the electric conductor is set in the edge portion of the electric conductor. If the probe moves out of the recording surface, the probe contacts with the edge portion of the electric conductor. Therefore, the fact that the probe moves out of the recording surface can be electrically detected. Thus, the moving of the probe can be controlled on the basis of a result of the detection. If the edge portion of the electric conductor is arranged so as to surround the recording surface, the fact that the probe moves out of the recording surface can be detected in all directions. Moreover, according to this aspect, since the edge portion of the electric conductor is located at the peripheral portion of the recording surface, it is possible to remove electric charge on the recording surface rapidly. If the edge portion of the electric conductor is arranged so as to surround the peripheral portion of the recording surface, the ability to remove the electric charge can be improved.

In another aspect of the dielectric recording medium of the present invention, the electric conductor is provided with: a first electric conductor portion located on the back surface of the dielectric material; a second electric conductor portion located on a side surface of the dielectric material and connected with the first electric conductor portion; and a third electric conductor portion located at a peripheral portion of the recording surface of the dielectric material and connected with the second electric conductor portion. Preferably, all of the side surfaces of the dielectric material may be covered with the second electric conductor portion, and the peripheral portion of the recording surface may be surrounded with the third electric conductor portion.

According to this aspect, the third electric conductor portion is located at the peripheral portion of the recording surface. The third electric conductor portion is connected with the first electric conductor portion located on the back surface of the dielectric material through the second electric conductor portion located on a side surface of the dielectric material. Therefore, the same electric potential as that of the first electric conductor portion is set in the third electric conductor portion. If the probe moves out of the recording surface, the probe contacts with the third electric conductor portion. Therefore, the fact that the probe moves out of the recording surface can be electrically detected. Thus, the moving of the probe can be controlled on the basis of a result of the detection. If the third electric conductor portion is arranged so as to surround the peripheral portion of the recording surface, the fact that the probe moves out of the recording surface can be detected in all directions. Moreover, according to this aspect, since the third electric conductor portion is located at the peripheral portion of the recording surface, it is possible to remove electric charge on the recording surface rapidly. If the third electric conductor portion is arranged so as to surround the peripheral portion of the recording surface, the ability to remove the electric charge can be improved.

In another aspect of the dielectric recording medium of the present invention, the substrate is a silicon substrate.

According to this aspect, the silicon substrate is chemically stable and hardly changes in shape thermally. Using the silicon substrate gives a major effect on maintaining the planarity of the recording surface and protecting from mechanical destruction.

In another aspect of the dielectric recording medium of the present invention, a concave portion is provided for the bonding surface of the substrate.

According to this aspect, if the dielectric material is bonded to the bonding surface of the substrate, excessive adhesive enters the concave portion. Therefore, the excessive adhesive can be substantially absorbed into the bonding surface of the substrate, and thus, the flatness of an adhesive surface can be ensured. The concave portion can be formed by performing a mechanical process or an etching process. For example, grooves formed with a mechanical device or an etching device may be used as the concave portions. Alternatively, the concave portions can be formed by roughening the bonding surface by performing a mechanical process or a chemical process.

In another aspect of the dielectric recording medium of the present invention, the back surface of the dielectric material is bonded to the bonding surface of the substrate by using a resin adhesive.

According to this aspect, even if the recording surface of the dielectric material is large and the thickness of the dielectric material is thin, it is possible to bond the dielectric material firmly to the substrate with the flatness ensured.

In another aspect of the dielectric recording medium of the present invention, the dielectric material is a ferroelectric material.

According to this aspect, since the ferroelectric material is used as the dielectric material, it is possible to make the presence or the absence of the recorded information precise in the polarization domain. Therefore, the recording and the reproducing are well performed.

In another aspect of the dielectric recording medium of the present invention, the dielectric material is $LiTaO_3$.

According to this aspect, a Z-cut $LiTaO_3$ may be used as the dielectric material. Since the dielectric constant of $LiTaO_3$ is low, the polarization is easily reversed by the application of the electric field. Therefore, it is possible to make the presence or the absence of the recorded information precise in the polarization domain. Thus, the recording and the reproducing are well performed.

The above object of the present invention can be achieved by a method of producing a dielectric recording medium for recording information in a dielectric material. The method is provided with: a mask formation process of forming a mask on a first surface of the dielectric material to cover a recording area with the mask; a first etching process of etching the first surface of dielectric material to remove a predetermined amount of the dielectric material located in an area which is not covered with the mask; a mask removing process of removing the mask from the first surface of the dielectric material; a conductor formation process of forming a conductive thin film over the whole of the first surface of the dielectric material; a bonding process of bonding the first surface of the dielectric material over which the conductive thin film is formed to a bonding surface of a substrate; and a second etching process of etching a second surface of the dielectric material which is on the opposite side to the first surface.

According to this method, it is possible to mass-produce the ultrathin dielectric recording medium of the present invention in high quality and at a low price.

In the mask formation process, a mask is formed on the first surface of the dielectric material to cover a recording area with the mask. The location of the recording area corresponds to the location of the recording surface of the dielectric recording medium for recording information thereon. The recording area is defined by forming the mask thereon. A mask preparation method that is generally used may be used. In the case of preparing a single dielectric recording medium, the mask is formed so as to cover one recording area. In the case of preparing a plurality of dielectric recording media, a plurality of masks are formed so as to cover the respective recording areas. In this case, the respective recording areas (i.e. the respective masks) are arranged with spaces between them necessary for cutting the dielectric material to divide the dielectric material (with the substrate, etc.) into the individual dielectric recording medium.

In the first etching process, the first surface of the dielectric material is etched to remove a predetermined amount of the dielectric material located in an area which is not covered with the mask. Since the mask covers the recording area, the peripheral portion of the recording area is removed by a predetermined depth. This depth corresponds to the thickness of the recording medium. After this etching process, the mask is removed from the first surface of the dielectric material.

In the conductor formation process, the conductive thin film is formed over the whole of the first surface of the dielectric material which is etched in the first etching process. This surface corresponds to the back surface of the dielectric material. A method of vacuum deposition, sputtering, CVD (Chemical Vapor Deposition), or the like can be used for forming this conductive thin film. This conductive thin film corresponds to the electric conductor of the dielectric recording medium.

In the bonding process, the first surface of the dielectric material over which the conductive thin film is formed to the bonding surface of the substrate. A resin adhesive can be used by bonding these surfaces. By firmly bonding the dielectric material having the conductive thin film thereon to the substrate, it is possible to ensure the strength and the planarity on the dielectric recording medium.

In the second etching process, the second surface of the dielectric material is etched. The second surface is on the opposite side to the first surface. This etched surface becomes the recording surface of the dielectric recording medium. The etching is performed until the conductive thin film located at the peripheral portion of the recording area (i.e., recording surface) is exposed. The conductive thin film exposed by this etching becomes the electric conductor located at the peripheral portion of the recording surface of the dielectric material (i.e., the edged portion of the electric conductor or the third electric conductor portion).

In one aspect of the method of producing the dielectric recording medium of the present invention, a plurality of the recording areas exist on the first surface, and the method is further provided with a division process of dividing a structure produced by bonding the dielectric material and the substrate to each other into a plurality of parts so as to separate the plurality of the recording areas from each other, after the second etching process.

According to this aspect, in the case of forming the plurality of dielectric recording media, they are cut and divided into individual dielectric recording media along the space between the recording areas after the second etching process. Laser and dicing may be used for the division.

In another aspect of the method of producing the dielectric recording medium of the present invention, the method is further provided with: a measurement process of measuring an etched amount of the dielectric material in the second etching process; and a control process of controlling the second etching process on the basis of the etched amount measured by said measurement process.

According to this aspect, in the measurement process, an amount etched by the second etching process is measured. Alternatively, the measurement process can be achieved by detecting that the conductive thin film is exposed. As a measurement device or a detection device, a magnetic device, an electric device, an optical device and the like may be used. In the control process, the second etching process is controlled on the basis of the result measured or detected in the measurement process. By this, if it is confirmed that the conductive thin film located at the peripheral portion of the recording area is exposed, the etching is stopped. In this manner, it is possible to control an accurate etched amount.

In another aspect of the method of producing the dielectric recording medium of the present invention, the method is further provided with: a concave portion formation process of forming a concave portion on the bonding surface of the substrate before the bonding process.

According to this aspect, before the dielectric material is bonded, the concave portion for absorbing excessive adhesive is formed on the surface of the substrate. It is possible to form this concave portion using the mechanical device, the etching device and the chemical device.

In another aspect of the method of producing the dielectric recording medium of the present invention, in the first etching process, the first surface of dielectric material is etched by dry etching method.

According to this aspect, a dry etching method is used for the etching the first surface of the dielectric material. By using the dry etching method, it is possible to etch the first surface accurately to be in a predetermined depth, with the recording area left In another aspect of the method of producing the dielectric recording medium of the present invention, in the second etching process, the second surface of the dielectric material is polished by mechanical polishing method.

According to this aspect, it is possible to quickly etch the dielectric material until reaching the conductive thin film.

In another aspect of the method of producing the dielectric recording medium of the present invention, the second etching process is provided with: a mechanical polishing process of polishing the second surface of the dielectric material by using a mechanical polishing method; and a dry etching process of etching the second surface polished in the mechanical polishing process by using a dry etching method.

According to this aspect, in the etching of the dielectric material until reaching the conductive thin film located at the peripheral portion of the recording area, firstly, the dielectric material can be quickly polished by the mechanical polishing with the predetermined thickness left, which does not reach the conductive thin film. Secondly, the dielectric material can be accurately etched by the dry etching, whose etching rate is slower than that of the mechanical polishing and which can precisely and easily control the etched amount, until the conductive thin film appears.

In another aspect of the method of producing the dielectric recording medium of the present invention, the method is further provided with: a wet etching process of performing wet etching after the dry etching process.

According to this aspect, this wet etching aims at the removal of the final affected layer. It is possible to remove a portion in which the crystalline deteriorates due to the fabrication process of the substrate, and thus it is possible to bring out the ferroelectricity of a sheet of the crystal in a good condition.

The above object of the present invention can be achieved by an apparatus for producing a dielectric recording medium for recording information in a dielectric material. The apparatus is provided with: a mask formation device for forming a mask on a first surface of the dielectric material to cover a recording area with the mask; a first etching device for etching the first surface of dielectric material to remove a predetermined amount of the dielectric material located in an area which is not covered with the mask; a mask removing device for removing the mask from the first surface of the dielectric material; a conductor formation device for forming a conductive thin film over the whole of the first surface of the dielectric material; a bonding device for bonding the first surface of the dielectric material over which the conductive thin film is formed to a bonding surface of a substrate; and a second etching device for etching a second surface of the dielectric material which is on the opposite side to the first surface.

According to the apparatus of the present invention, it is possible to mass-produce the ultrathin dielectric recording medium of the present invention in high quality and at a low price.

The mask formation device forms a mask on the first surface of the dielectric material to cover a recording area with the mask. A mask preparation method that is generally used may be used.

The first etching device etches the first surface of the dielectric material to remove a predetermined amount of the dielectric material located in an area which is not covered with the mask by a predetermined depth. This depth corresponds to the thickness of the recording medium. As this first etching device, there are an ECR (Electron Cyclotron Resonance) etching apparatus, an RIE (Reactive Ion Etching) etching apparatus, an ion beam etching apparatus and the like. Using such a etching apparatus, it is possible to etch the dielectric material accurately. Even an oxide material, such as $LiTaO_3$, allows the dry etching in a good condition.

The conductor formation device forms the conductor thin film over the whole of the first surface of the dielectric material etched by the first etching device. A vacuum deposition apparatus, a sputtering apparatus, a CVD apparatus or the like can be used for forming the conductive thin film.

The bonding device bonds the first surface of the dielectric material over which the conductive thin film is formed to the bonding surface of the substrate. A resin adhesive can be used as an adhesive.

The second etching device etches the second surface of the dielectric material which is on the opposite side to the first surface, until the conductive thin film located at the peripheral portion of the recording area is exposed.

In one aspect of the apparatus for producing the dielectric recording medium of the present invention, a plurality of the recording areas exist on the first surface, and the apparatus further provided with a division device for dividing a structure produced by bonding the dielectric material and the substrate to each other into a plurality of parts so as to separate the plurality of the recording areas from each other, after an etching process with the second etching device.

According to this aspect, in the case of forming the plurality of dielectric recording media, they are cut and divided into individual dielectric recording media along the spaces between the recording areas by using the division device such as laser device and dicing device.

In another aspect of the apparatus for producing the dielectric recording medium of the present invention, the apparatus is further provided with: a measurement device for measuring an etched amount of the dielectric material; and a control device for controlling the second etching device on the basis of the etched amount measured by said measurement device.

According to this aspect, the measurement device measures an amount etched by the second etching device, or it detects that the conductive thin film is exposed. As the measurement device, an analysis device, such as a magnetic device, an electric device, an optical device, and a Q-mass (Quadrupole Mass spectrometer), may be used. For example, in an analysis of emission spectrum, when the etching of the dielectric material goes on, the composition of the conductive thin film is included in the emission spectrum of plasma, which means the conductive thin film is exposed. That is how to detect the etched amount. The control device controls the second etching device on the basis of the result measured by the measurement device. By this, if it is confirmed that the conductive thin film located at the peripheral portion of the recording area is exposed, the etching is stopped.

In another aspect of the apparatus for producing the dielectric recording medium of the present invention, the apparatus is further provided with a concave portion formation device for forming a concave portion on the bonding surface of the substrate before a bonding process with the bonding device.

According to this aspect, before the dielectric material is bonded to the substrate, the concave portion for absorbing excessive adhesive is formed.

In another aspect of the apparatus for producing the dielectric recording medium of the present invention, the second etching device is provided with: a mechanical polishing device for polishing the second surface of the dielectric material by mechanical polishing method; and a dry etching device for etching the second surface polished in the mechanical polishing process by dry etching method.

According to this aspect, in the etching of the dielectric material until reaching the conductive thin film, firstly, the dielectric material can be quickly polished by the mechanical polishing device with the predetermined thickness left, which does not reach the conductive thin film. Secondly, the dielectric material can be accurately etched by the dry etching, until the conductive thin film surrounding the recording area appears.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Embodiment Associated with the Dielectric Recording Medium

Figure 1A:
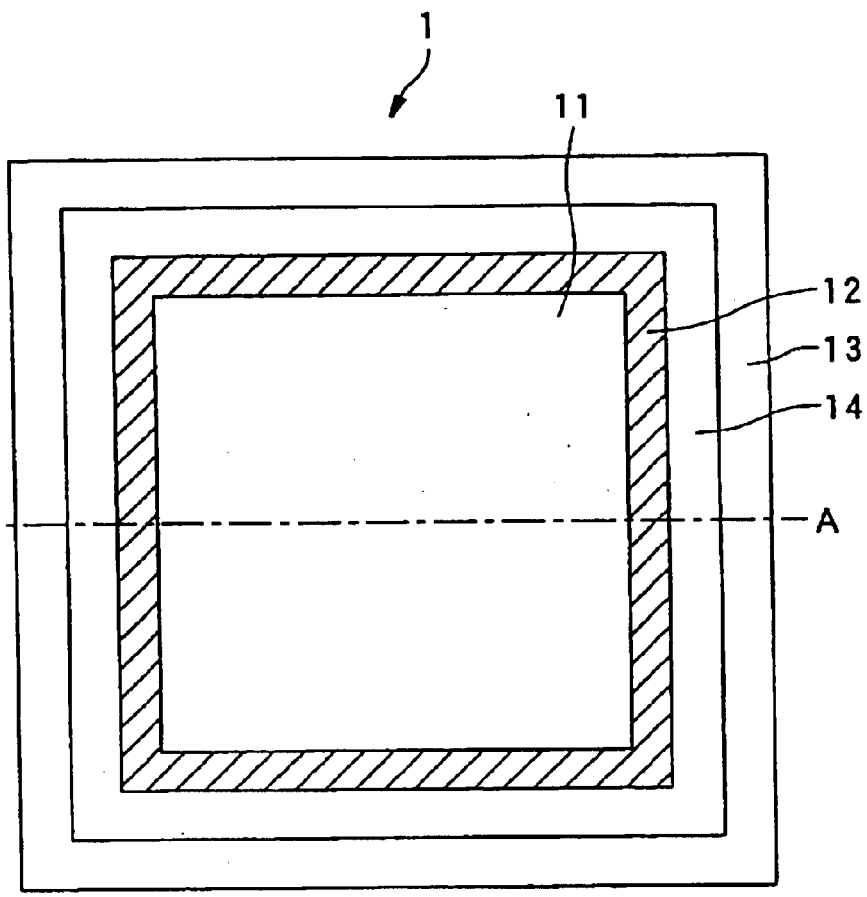
FIG. 1A is a plan view showing a first embodiment of the dielectric recording medium of the present invention.
Figure 1B:
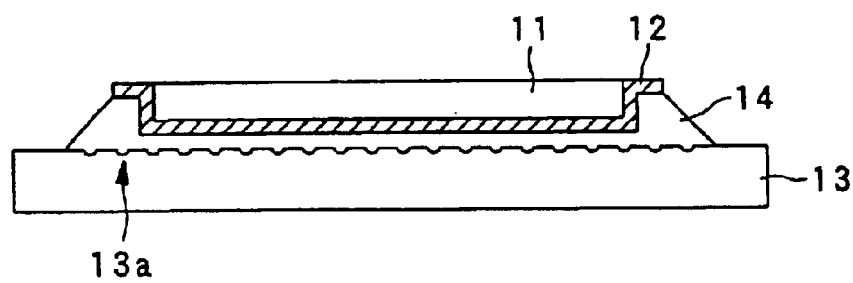
FIG. 1B is an A-A cross sectional side view of FIG. 1A.
Figure 2A:
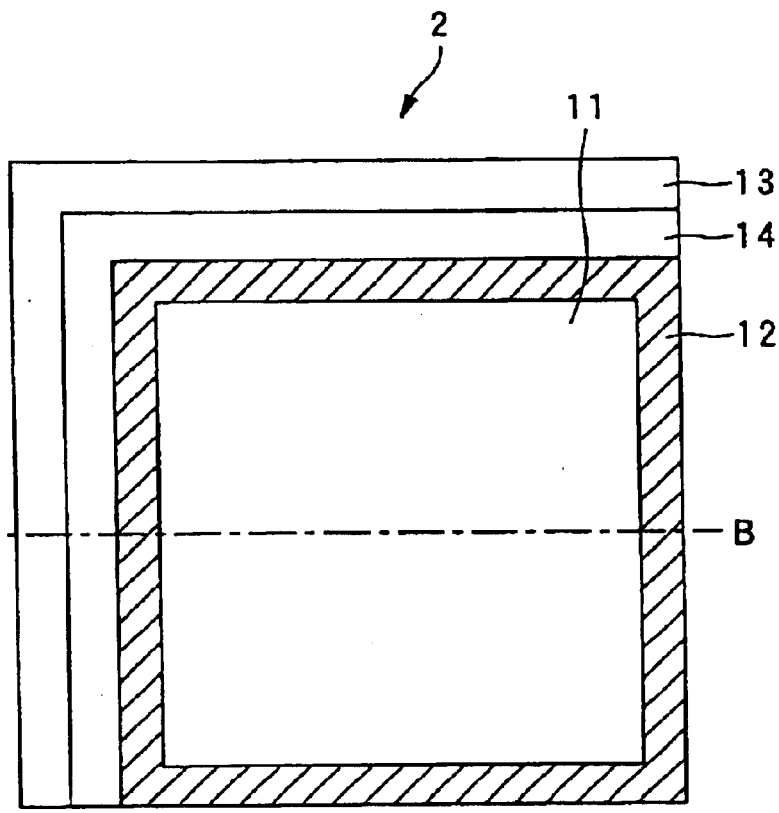
FIG. 2A is a plan view showing a second embodiment of the dielectric recording medium of the present invention.
Figure 2B:
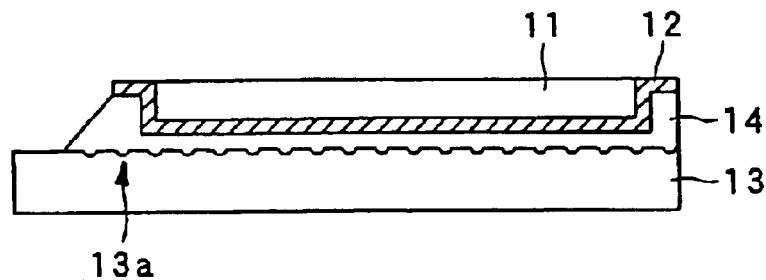
FIG. 2B is a B-B cross sectional side view of FIG. 2A.
Figure 3A:
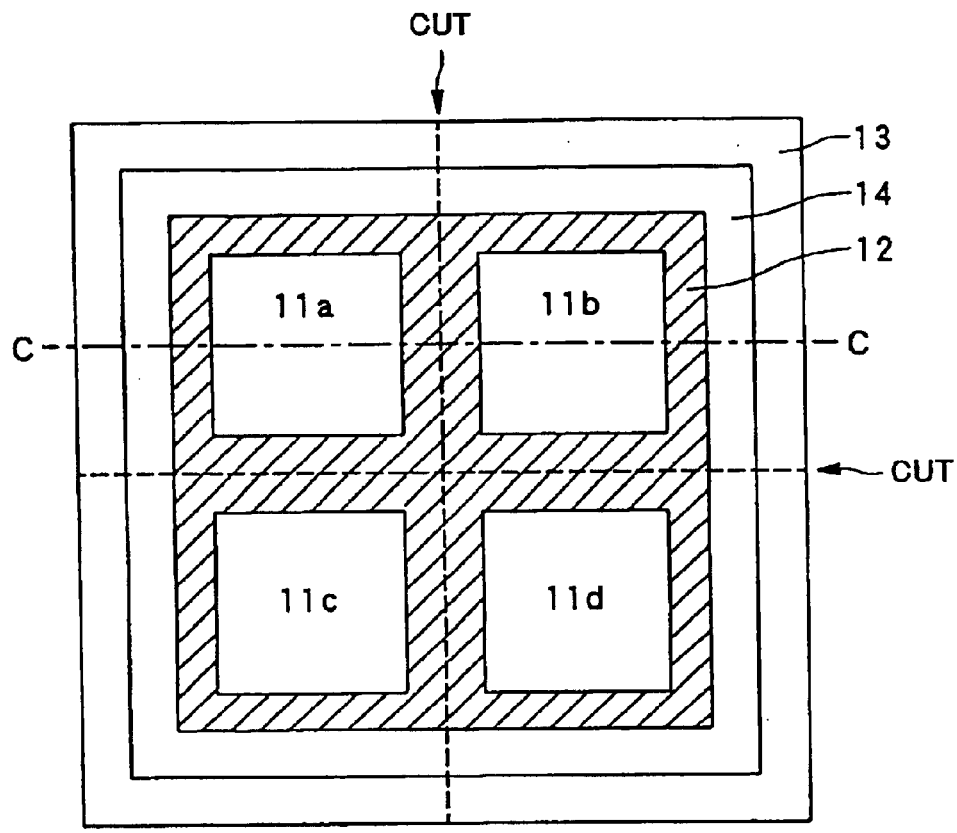
FIG. 3A is a plan view showing the preparation of the dielectric recording media shown in FIG. 2A and FIG. 2B.
Figure 3B:
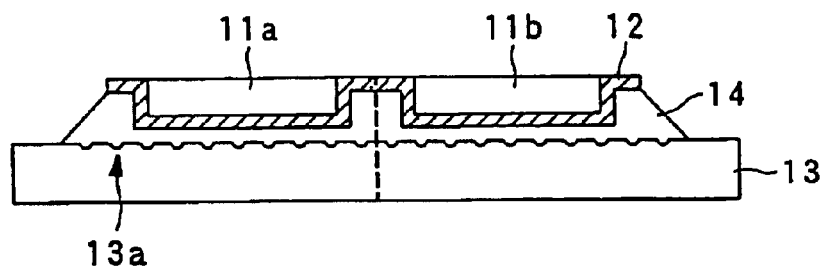
FIG. 3B is a C-C cross sectional side view of FIG. 3A.
Figure 4A:
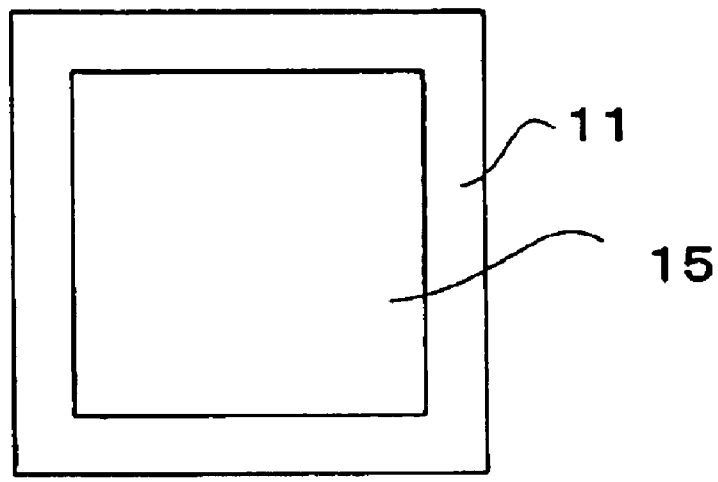
FIG. 4A and FIG. 4B are plan views showing the preparation forms of the dielectric recording medium of the present invention, FIG. 4A showing a mask layout in the case of a single dielectric recording medium, and FIG. 4B showing a mask layout in the case of a plurality of dielectric recording media.
Figure 4B:
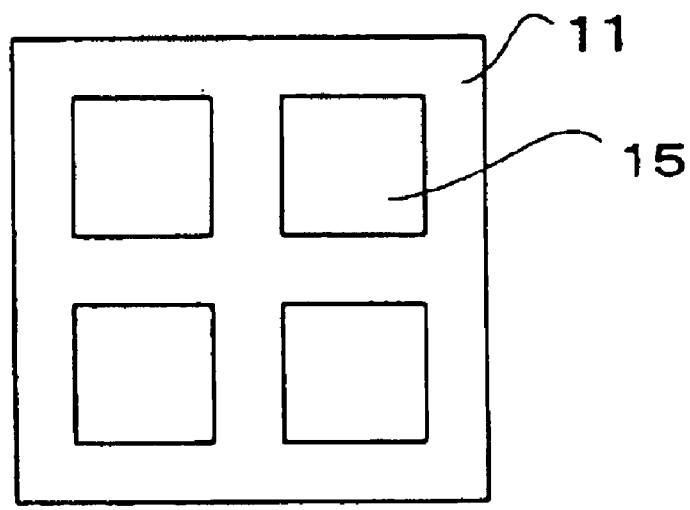

The embodiment of the dielectric recording medium of the present invention will be explained with reference to FIG. 1A to FIG. 4B. FIG. 1A is a plan view showing a first embodiment of the dielectric recording medium of the present invention. FIG. 1B is an A-A cross sectional side view of FIG. 1A. FIG. 2A is a plan view showing a second embodiment of the dielectric recording medium of the present invention. FIG. 2B is a B-B cross sectional side view of FIG. 2A. FIG. 3A is a plan view showing the preparation of the dielectric recording medium shown in FIG. 2A and FIG. 2B. FIG. 3B is a C-C cross sectional side view of FIG. 3A. FIG. 4A and FIG. 4B are plan views showing the preparation forms of the dielectric recording medium of the present invention, FIG. 4A showing a mask layout in the case of a single dielectric recording medium, and FIG. 4B showing a mask layout in the case of a plurality of dielectric recording media.

A dielectric recording medium 1 is constructed, as shown in FIG. 1, such that a dielectric material 11, a conductive thin film 12, and a substrate 13 are laminated and that the conductive thin film 12 and the substrate 13 are bonded by a resin adhesive 14.

The dielectric material 11 is, for example, a ferroelectric single crystal having a uniform thickness, and its one surface is used for a recording and/or reproducing surface on which a probe for recording and/or reproducing works. The size of the dielectric material 11 is large, such as on the order of mm on a side and about 5000 Å thick, for example. As the material, $LiTaO_3$ is used, which has a 180-degree domain. As the other dielectric materials, the following is conceivable: a PZT material as being a solid solution of $PbTiO_3$—$PbZrO_3$; barium titanate represented as $BaTiO_3$; lithium niobate represented as $LiNbO_3$; a PLZT material as being a solid solution of lead (Pb), lantern (La), zirconium (Zr), and titanium (Ti); and the like.

The conductive thin film 12, which is about 1000 to 2000 Å thick, is placed on a surrounding portion of the recording and/or reproducing surface of the dielectric material 11, except on the recording and/or reproducing surface. This conductive thin film 12 is coated by metal such as aluminum by using the method of vacuum deposition, sputtering, CVD or the like, and is connected to the ground of a recording and/or reproducing apparatus. Other than the aluminum, metal such as platinum and an oxide conductive film such as $InO_2$ which has a good corrosion resistance may be also used.

The substrate 13 is intended to preserve the thin dielectric material 11 and maintain the planarity of the dielectric material 11. Silicon or the like in a predetermined thickness may be used, for example. Moreover, concave portions 13a are formed on the surface for bonding the dielectric material 11 thereto. The concave portions 13a are relatively large, and they are effective in absorbing excessive adhesive and forming a uniform and flat adhesive surface when the thin dielectric material 11 is bonded onto the substrate 13.

The resin adhesive 14 is an adhesive for bonding to the substrate 13 the dielectric material 11 for which the conductive thin film 12 is provided. It gives strong adhesion and the flat adhesive surface.

Furthermore, in order to ensure the convenience of handling the dielectric recording medium 1 having this structure and its strength, a material such as plastic or ceramics may be used to package the recording medium except the recording and/or reproducing surface.

A dielectric recording medium 2 in FIG. 2A and FIG. 2B is in the form that one is cut out of a plurality of dielectric recording media. This medium is produced by using a method of preparing a plurality of dielectric recording media at a time. The structure and the functions of the dielectric recording medium 2 are the same as those of the dielectric recording medium 1 explained with reference to FIG. 1A and FIG. 1B. FIG. 3A and FIG. 3B show four dielectric recording media prepared at a time. They are cut off in the last process, and divided into dielectric recording media 11a to 11d. Masks 15 used for these productions are shown in FIG. 4A and FIG. 4B. The dielectric recording medium 2 shown in FIG. 2 corresponds to the one which is cut out. It is also possible to prepare much more dielectric recording media at a time.

The function of the dielectric recording medium 1 having the above-described structure as a recording medium is as follows. When a voltage is applied to a probe that abuts on the recording and/or reproducing surface of the dielectric material 11, an electric field is generated between the probe and the conductive thin film 12, which is on the back surface of the dielectric material 11, and the portion on which the probe abuts is polarized. By having this polarization reached to the back surface of the dielectric material 11, a stable polarization domain is formed, and information is recorded in it. On the other hand, with respect to the reproduction, by having the probe abutted on the recording and/or reproducing surface to trace it, a minute volume change corresponding to the polarization is detected, for example, by a nonlinear microscope method, and the recorded information is reproduced. In this case, by initiating the whole medium in advance to a + surface or a − surface, it is possible to improve S/N ratio.

The dielectric recording media 1 and 2 as described above are super-high-density recording and/or reproducing media having recording density more than 1 T bits/inch$^2$.

Figure 5A:
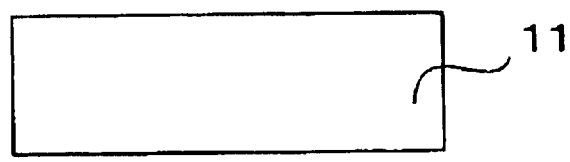
FIG. 5A to FIG. 5D are cross sectional views showing processes of producing the dielectric recording medium of the present invention, FIG. 5A showing a dielectric material, FIG. 5B showing such a condition that a resist is disposed on the dielectric material, FIG. 5C showing such a condition that etching is performed, and FIG. 5D showing such a condition that the resist is removed.
Figure 5B:
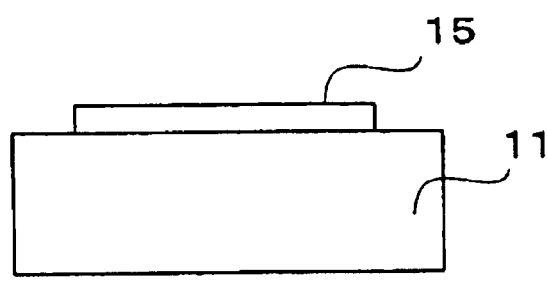
Figure 5C:
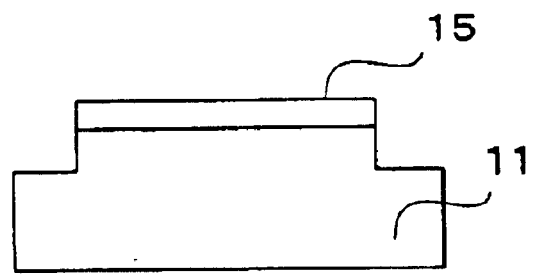
Figure 5D:
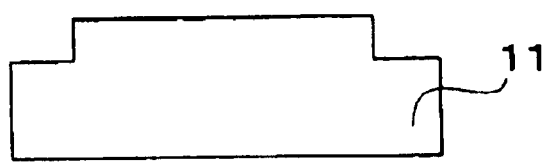
Figure 6A:
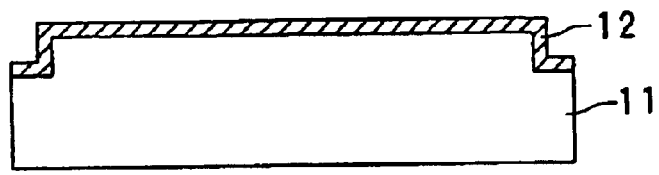
FIG. 6A to FIG. 6D are cross sectional views showing processes of producing, which follows FIG. 5D, FIG. 6A showing such a condition that a conductive thin film is formed on the etched surface, FIG. 6B showing such a condition that the conductive-thin-film-formed surface is bonded to a substrate, FIG. 6C showing such a condition that the dielectric material is polished by mechanical polishing, and FIG. 6D showing such a condition that the dielectric material is etched by plasma etching after the mechanical polishing.
Figure 6B:
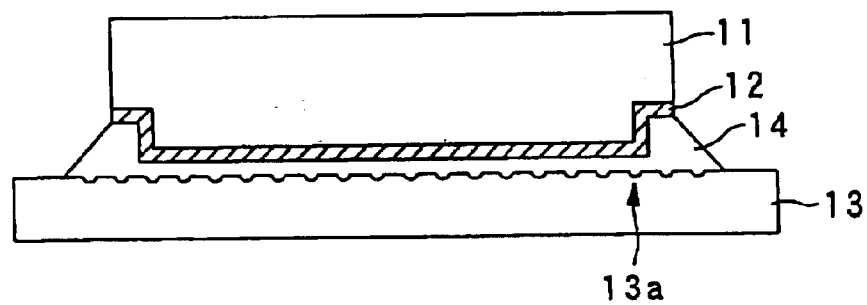
Figure 6C:
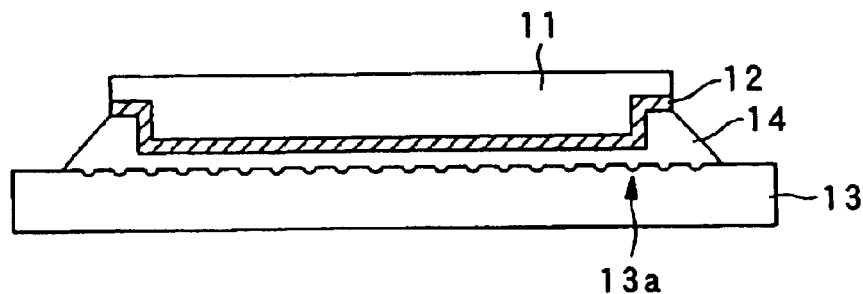
Figure 6D:
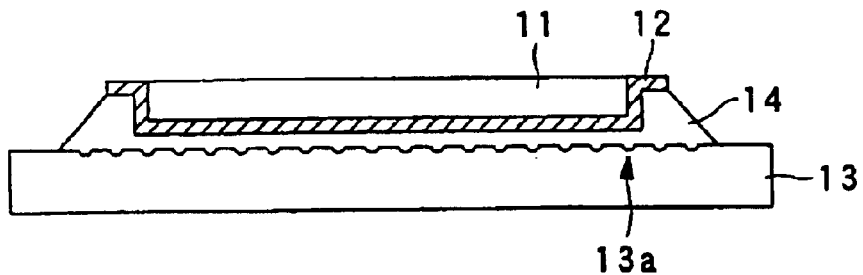
Figure 7A:
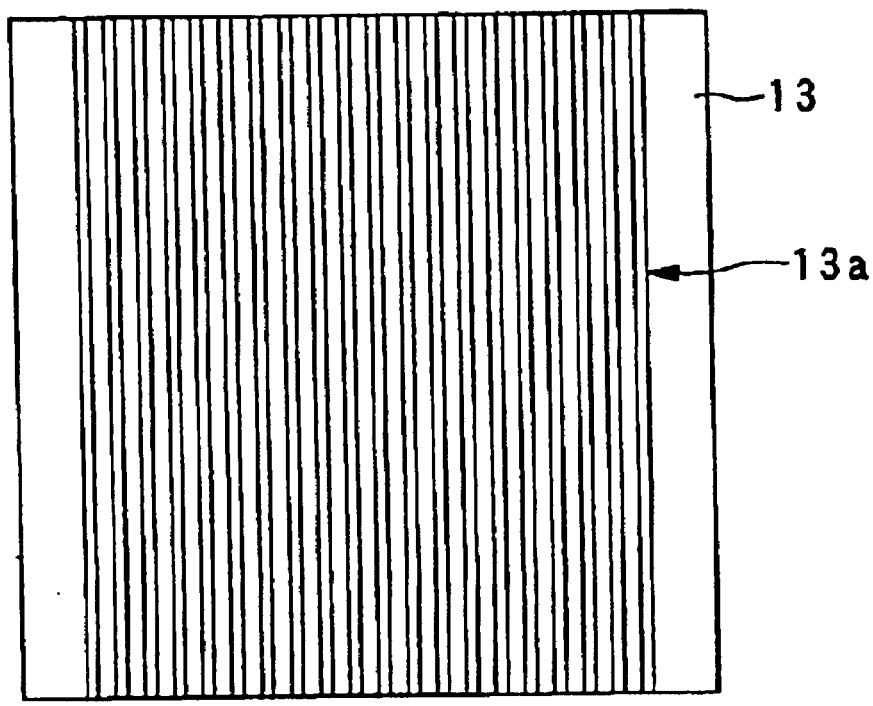
FIG. 7A and FIG. 7B are schematic diagrams showing bonding surface conditions of the substrate, FIG. 7A showing such a condition that grooves are provided, and FIG. 7B showing such a condition that the surface is roughened and that concave portions are formed.
Figure 7B:
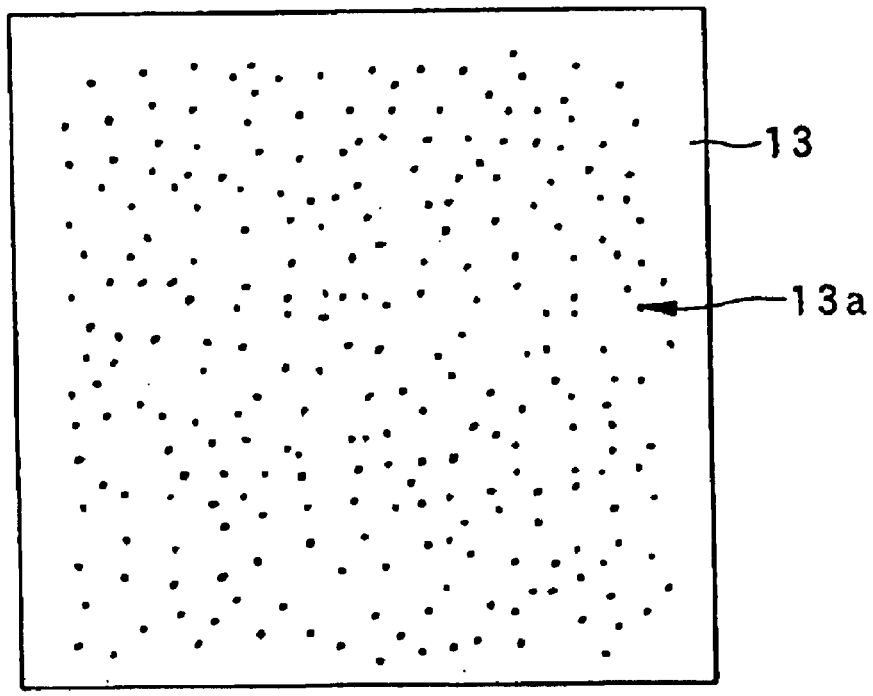

Embodiment Associated with a Method of Producing the Dielectric Recording Medium Next, the method of producing the electric recording medium will be explained with reference to FIG. 5A to FIG. 7B. Here, the form of preparing a plurality of recording media as shown in FIG. 3A and FIG. 3B will be explained, but a single recording medium can be prepared in the same method. FIG. 5A to FIG. 5D are cross sectional views showing processes of producing the dielectric recording medium of the present invention, FIG. 5A showing a dielectric material, FIG. 5B showing such a condition that a resist is disposed on the dielectric material, FIG. 5C showing such a condition that etching is performed, and FIG. 5D showing such a condition that the resist is removed. FIG. 6A to FIG. 6D are cross sectional views showing processes of producing, which follows FIG. 5D, FIG. 6A showing such a condition that a conductive thin film is formed on the etched surface, FIG. 6B showing such a condition that the conductive-thin-film-formed surface is applied on a substrate, FIG. 6C showing such a condition that the dielectric material is polished by mechanical polishing, and FIG. 6D showing such a condition that the dielectric material is etched by plasma etching after the mechanical polishing. FIG. 7A and FIG. 7B are schematic diagrams showing bonding surface conditions of the substrate, FIG. 7A showing such a condition that grooves are provided, and FIG. 7B showing such a condition that the surface is roughened and that concave portions are formed.

Firstly, as shown in FIG. 6A, as the dielectric material 11, a ferroelectric single crystal is used. In the dielectric material 11, the length of one side is about 10 mm. The thickness is about 0.2 to 0.5 mm. Both surfaces are parallel to each other and mirror-polished. For example, a Z-cut $LiTaO_3$ single crystal is used.

Secondly, as shown in FIG. 5B, the mask 15 is disposed on one surface of the dielectric material 11 so as to cover a recording area. The mask 15 may be formed in a method generally used for a metal film, a resist film, a dry resist film or the like.

Then, as shown in FIG. 5C, by etching such as RIE (Reactive Ion Etching), ECR (Electron Cyclotron Resonance) plasma or ion beam, a surrounding portion of the mask 15 is etched to be 0.5 $\mu$m or less deep, i.e. it is etched to be about as thick as the recording medium.

Then, as shown in FIG. 5D, the mask 15 is removed and the depth of the etching is precisely measured using a contact probe profilometer, a laser interferometer or the like. The thickness of the recording medium is finally determined on the basis of this depth. The data measured here is used in the etching process as feedback data.

Then, as shown in FIG. 6A, the conductive thin film 12 which will be an electrode of the recording medium is formed on the etched surface in the method such as sputtering or deposition. As the material of the conductive thin film 12, a metal material, such as aluminum or platinum, and an oxide conductive thin film, such as $InO_2$ which has a good corrosion resistance, may be used.

Then, as shown in FIG. 6B, the conductive thin film 12 and the substrate 13 are bonded by a strong adhesive material, such as the resin adhesive. The substrate 13 may be silicon, for example, and has on its bonding surface the concave portions 13a in groove shape as shown in FIG. 7A or the concave portions 13a formed by its surface being roughened as shown in FIG. 7B. The concave portions 13a absorb excessive adhesive, which makes the adhesive surface uniform and flat. It is necessary to keep a dielectric single crystal having a large recording surface and thin thickness being the uniform flat surface. To this end, the concave portions 13a are greatly effective. Moreover, the adhesion onto the strong silicon substrate 13 prevents the deformation and the damage of the dielectric single crystal.

Then, as shown in FIG. 6C, the dielectric material 11 is polished to be 10 $\mu$m or less, for example. Here, when the dielectric material 11 is mounted on a polishing apparatus, the adjustment is performed such that a surface plate of the polishing apparatus, which will be the reference plane, and an abrasive surface of the dielectric material 11 have parallelism at the optical wavelength level. For example, the parallelism is set by using a parallelism adjustment apparatus. In the parallelism adjustment apparatus, the reference plane of the polishing apparatus and a surface holding the dielectric material 11 are held at three points on the circumference so as to adjust the angle of the reference surface and the holding surface. The adjustment is performed by using an optical flat as the reference surface, for example, and by maximizing the interval of an interference pattern (a Newton ring) made with the surface of the dielectric material 11. According to this method, even if a parallelism gap occurs between the dielectric material 11 and the substrate 13 when the dielectric material 11 is bonded onto the substrate 13, the parallelism of the both surfaces of the dielectric material 11 by the polishing can be ensured.

In the abrasive process described above, by firstly carrying out a lapping process using about 1 $\mu$m abrasive grains, and then carrying out a CMP (Chemical Mechanical Polishing) process, it is possible to perform finishing with a less affected layer.

Moreover, as shown in FIG. 6D, by the etching, such as the RIE, the ECR plasma or the ion beam, from the abrasive surface, the dielectric material 11 is etched uniformly, thinly and precisely until the conductive thin film 12 appears which is placed on the surrounding portion of the dielectric material 11. With respect to the end point detection of the etching, it is possible to detect it with an analysis device, such as an emission spectrometer or the Q-mass, when the component elements of the conductive thin film 12 are released into the etching apparatus. When they are detected, the etching is ended.

The dielectric recording medium as prepared above has an enormous storage capacity on the order of 1.6 G bits/$mm^2$ if the polarization domain size is 25 nm which will be record dots, for example.

Incidentally, wet etching by acid such as hydrofluoric acid may be performed after the dry etching. This aims at the removal of the final affected layer. It is possible to remove a portion in which the crystalline deteriorates due to the machining of the substrate, and thus it is possible to bring out the ferroelectricity of a sheet of the crystal in a good condition.

Figure 8:
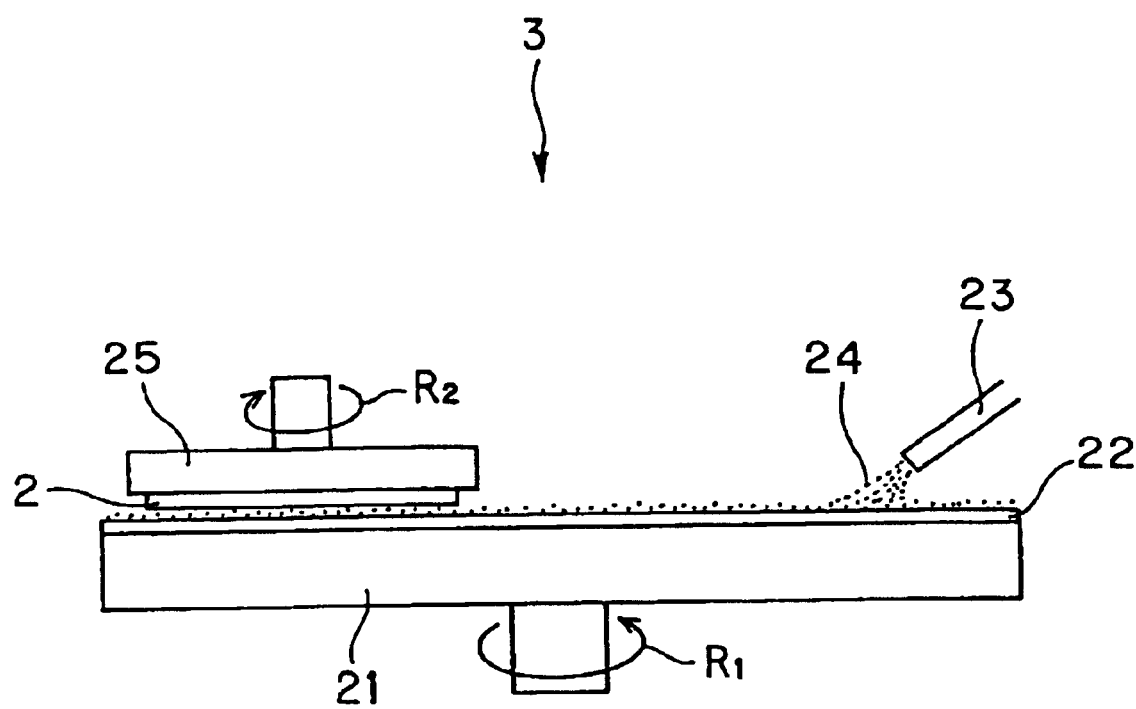
FIG. 8 is a schematic diagram showing one example of a chemical mechanical polishing apparatus.

Next, an example of the CMP used for the method of producing of the dielectric recording medium of the present invention will be explained. As shown in FIG. 8, the dielectric recording medium 2 is polished by dropping a liquid in which abrasive particles are dispersed, i.e. an abrasive 24, from a nozzle 23 onto an abrasive pad 22, which is applied on an abrasive table 21, pressing down against the abrasive pad 22 the dielectric recording medium 2 mounted on a turntable 25, and spinning the abrasive table 21 and the turntable 25 as shown with arrows R1 and R2, respectively. The used abrasive particles are minute silica particles, alumina particles or the like, on the order of several hundreds Å. Moreover, with respect to the liquid which disperses the abrasive particles, pH adjustment, electrolyte mixing, abrasive-particle dispersion, a state of aggregation and the like are controlled depending on the abrasive particles and the dielectric material 11.

Figure 9:
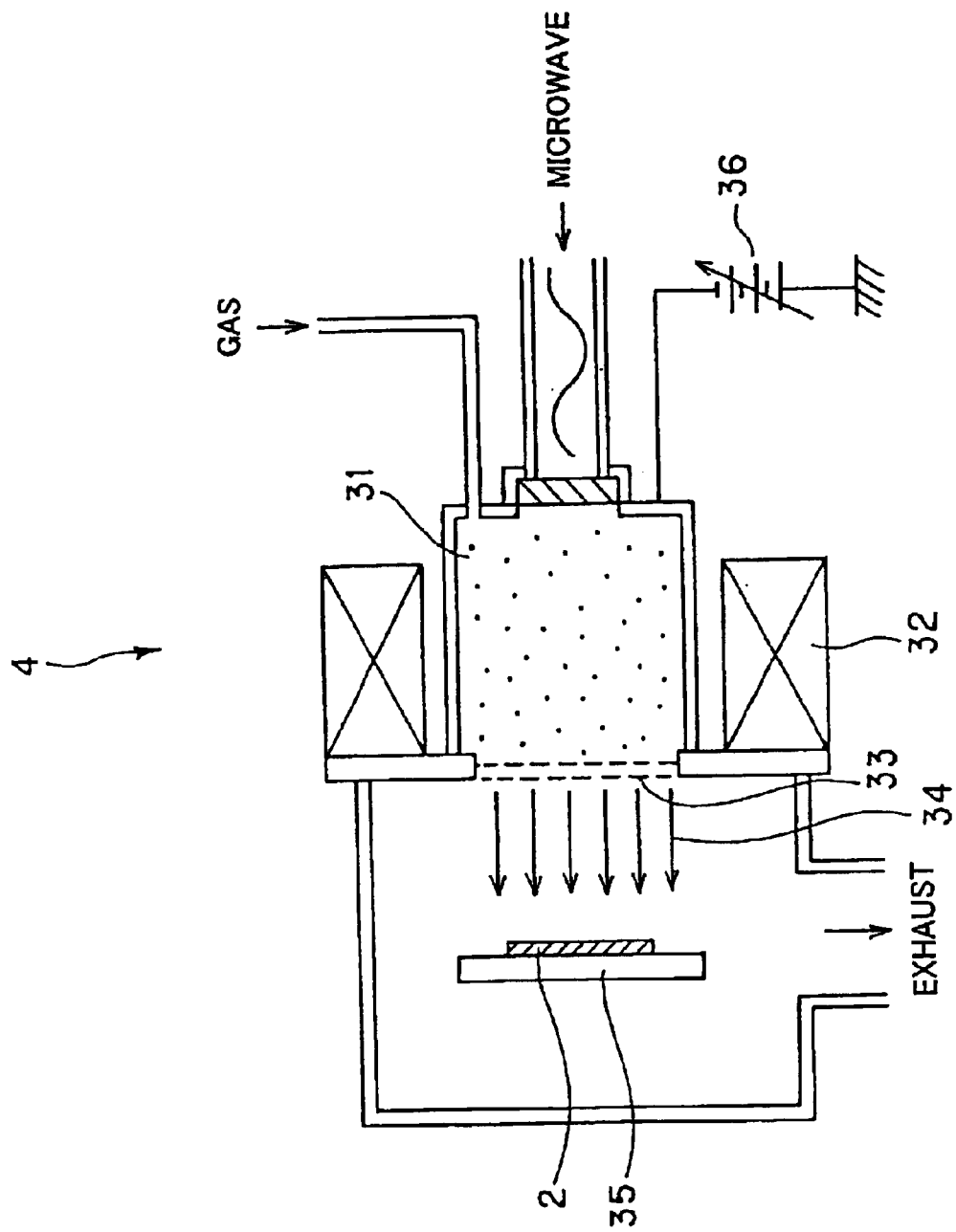
FIG. 9 is a schematic diagram showing an ECR etching apparatus, which is one example of a dry etching apparatus.

Next, an example of an ECR etching apparatus used for the method of producing the dielectric recording medium of the presentation will be explained. As shown in FIG. 9, a gas such as Ar is fed into a plasma generator 31, and an about 2.5 GHz microwave is applied. To the plasma generator 31, a minus DC voltage is applied, and plasma is generated. This plasma moves according to the axial intensity distribution of magnetic field formed by an electromagnet 32 placed around the circumference of the plasma generator 31, accelerates in parallel by an extraction electrode 33, and collides with the dielectric recording medium 2 mounted on a holder 35. The dielectric material 11 is etched by the collision energy. Since the condition of the etching depends on the collision angle of the plasma, it is designed such that the magnetic field around the holder 35 has a parallel magnetic field distribution and that the dielectric material 11 is irradiated with a plasma fluid, which is a high current, uniform and parallel.

Figure 10:
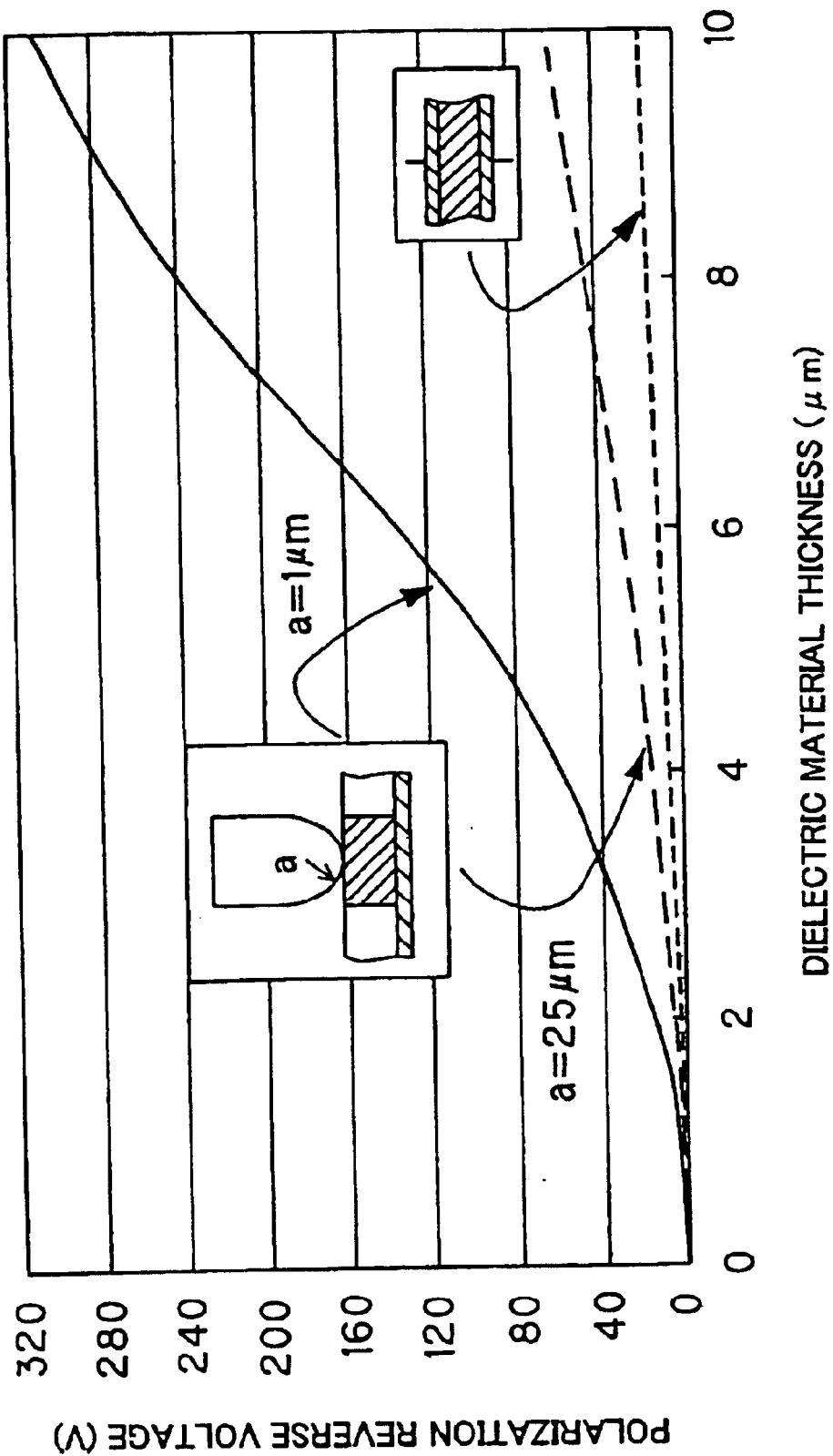
FIG. 10 is a schematic diagram showing a relationship between a thickness of the dielectric substance and a minimum voltage, which reverses a polarization domain, with a probe radius as a parameter, in the case of using a Z-cut $LiTaO_3$ single crystal as a recording material.

FIG. 10 is a schematic diagram showing a relationship between a thickness of the dielectric substance and a minimum voltage required for reversal of a polarization domain, with a probe shape as a parameter, in the case of using a Z-cut $LiTaO_3$ single crystal as the dielectric substance. Although FIG.10 shows the relationship in the case that the thickness of the dielectric recording medium and the diameter of the tip portion of the probe are on the order of $\mu$m, it is confirmed that if the thickness of the dielectric recording medium and the diameter of the tip portion of the probe are reduced to the order of nm, the relationship similar to that shown in FIG. 10 can be obtained. Since the polarization domain corresponding to the recorded information is formed substantially in the same size as the diameter of the probe, the diameter is preferably made small for high-density recording. On the other hand, as for the voltage required for forming the polarization domain, FIG. 10 teaches that as the dielectric material 11 becomes thicker, the required voltage becomes higher. Especially, when the diameter of the probe is small, the required voltage increases more rapidly, as the thickness of the dielectric material 11 increases. Therefore, in order to make the applied voltage low, e.g. about 10 V, it is necessary to thin down the dielectric material 11, e.g. about 5000 Å. The method of producing the dielectric recording medium of the present invention realizes this necessity.

In the above-described method, the ferroelectric single crystal can be an ideal ultrathin material, and it is possible to realize the recording medium with high density and high recording capacity which uses the uniform, flat and large ferroelectric single crystal.

Figure 11:
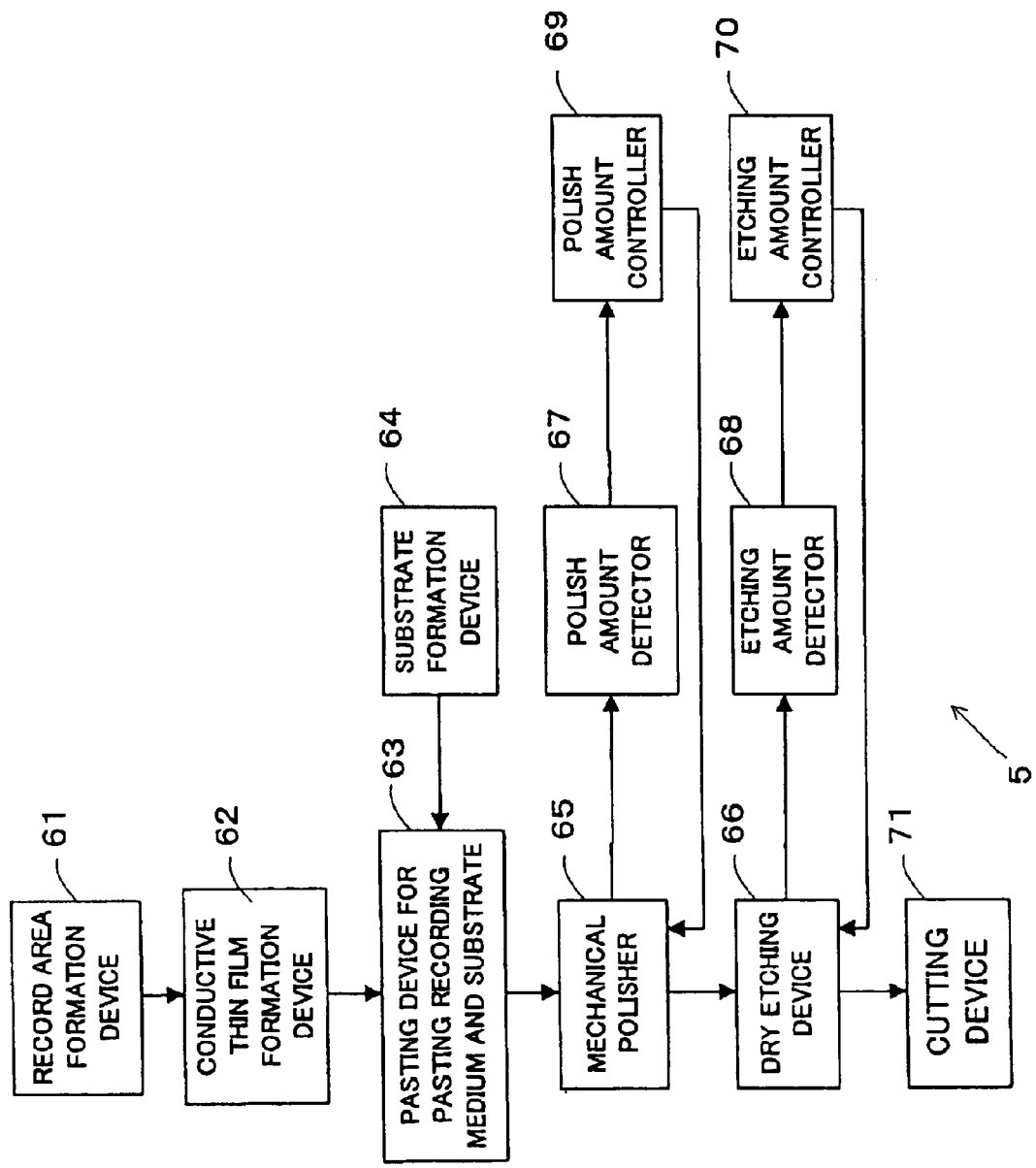
FIG. 11 is a block diagram of an apparatus for producing the dielectric recording medium associated with the present invention.

Embodiment Associated with an Apparatus for Producing the Dielectric Recording Medium The apparatus for producing the dielectric recording medium of the present invention shown in FIG. 11 is an apparatus for preparing a plurality of large dielectric recording media in a round of production processes. The apparatus is provided with: a recording area formation device 61; a conductive thin film formation device 62; a bonding device 63 for bonding the recording medium and the substrate; a substrate formation device 64; a mechanical polisher 65; a dry etching device 66; a polish amount detector 67; an etched amount detector 68; a polish amount controller 69; an etched amount controller 70; and a cutting device 71.

The recording area formation device 61 disposes the mask for covering a recording area portion, for example, in order to form four recording areas on the dielectric material 11, as shown in FIG. 4B. The mask can be prepared in a general-purpose method. The dielectric material 11 covered with the mask is etched by the ECR plasma, a RIE apparatus or the like, so as to be in a predetermined depth, e.g. about 5000 Å, with the record portion left. This etched amount is controlled by detecting the change of a plasma condition or the like, using a gas chromatography measurement, an analysis of emission spectrum and absorption spectrum of the plasma, a discharge impedance measurement or the like, which depend on the change of the types and the amounts of decomposition and reaction products. When the etching is ended, the mask is removed. The portion from which the mask is removed corresponds to the portion of the recording surface, and the etching depth corresponds to the thickness of the record portion.

The conductive thin film formation device 62 forms the conductive thin film 12 in a predetermined thickness on the whole of the surface etched at the recording area formation 61. This conductive thin film 12 is also formed on the sidewall etched, so that the conductive thin film 12 covers the whole surface of the dielectric material 11. The conductive thin film 12 is formed by using an apparatus for vacuum deposition, CVD or sputtering. The thickness of the conductive thin film 12 is controlled by time control using the deposition or growing rate of the thin film, a measurement of electric resistance or the like. As the material for forming the conductive thin film 12, metal such as platinum or aluminum, and an oxide conductive substance such as $InO_2$ are used.

The bonding device 63 bonds the surface of the dielectric material on which the conductive thin film 12 is formed to the substrate 13 using the resin adhesive. The concave portions 13a are formed on the bonding surface of the substrate 13. Excessive adhesive is absorbed on these concave portions 13a, and thus, the bonding surface can ensure the flatness after the adhesion.

The substrate formation device 64 provides the concave portions 13a for the bonding surface of the substrate 13. With respect to the formation of these concave portions 13a, the formation of grooves by mechanical grinding, polishing or etching, a method by chemical processing, or the like is used. These concave portions 13a are intended to absorb the excessive adhesive and ensure the flatness of the adhesive surface as described above.

The mechanical polisher 65 is, for example, the above-described mechanical polishing device as shown in FIG. 8, and it polishes the dielectric material 11 from the opposite surface to the substrate 13 until being under a predetermined thickness, e.g. under 10 $\mu$m or less. In order to polish a large surface to be in a uniform thickness, the optical-wavelength-level parallelism is required for the surface plane for polishing and the surface of a test piece. To this end, an adjustment mechanism capable of satisfying this requirement is provided. In this adjustment mechanism, the optical flat may be used, for example, and the adjustment is performed so as to maximize the interval of the interference pattern made with the surface of the test piece. As described above, the mechanical polisher 65 is used to ensure the parallelism of the dielectric material 11 and efficiently grind or polish it.

The dry etching device 66 finely and precisely etches it until the conductive thin film 12 is exposed after the mechanical polishing. As the dry etching, the ECR etching apparatus or the RIE apparatus described above may be used, for example, as shown in FIG. 9.

The polish amount detector 67 detects the amount polished by the mechanical polishing device, and serves to control the mechanical polish amount. As the detection device, it is possible to use a device for detecting the position of a mechanical portion corresponding to the polished thickness by using an electric, magnetic or optical scale.

The etched amount detector 68 detects the amount etched by the dry etching, and serves to control the dry etching. With respect to the end point detection of the etching, it is possible to use the gas chromatography measurement, the analysis of emission spectrum and absorption spectrum of the plasma, the Q-mass or the like, which depend on the change of the types and the amounts of decomposition and reaction products when the conductive thin film 12 is exposed.

The polish amount controller 69 controls the operation of the mechanical polisher 65, on the basis of the polished amount of the polish amount detector 67. This is intended to set the final etched amount of the dry etching, and as the etched amount of the dry etching is smaller, the production time shortens more. Therefore, it is preferable to gain a more mechanical polish amount within a range not to damage the conductive thin film 12.

The etched amount controller 70 controls the etched amount of the final finishing until the conductive thin film 12 is exposed. It controls, for example, the ECR etching apparatus, on the basis of detection data of the etched amount detector 68.

The cutting device 71 is a device for dividing a plurality of the recording area portions formed by the above-described devices and completing a plurality of dielectric recording media. As for the cutting, a cutting device such as laser or dicing may be used.

The apparatus for preparing the plurality of dielectric recording media at a time was explained above. With respect to the preparation of the single dielectric recording medium, it can be prepared using a mask for a single body at the recording area formation device 61 without carrying out the final process held in the cutting device 71.

Figure 12:
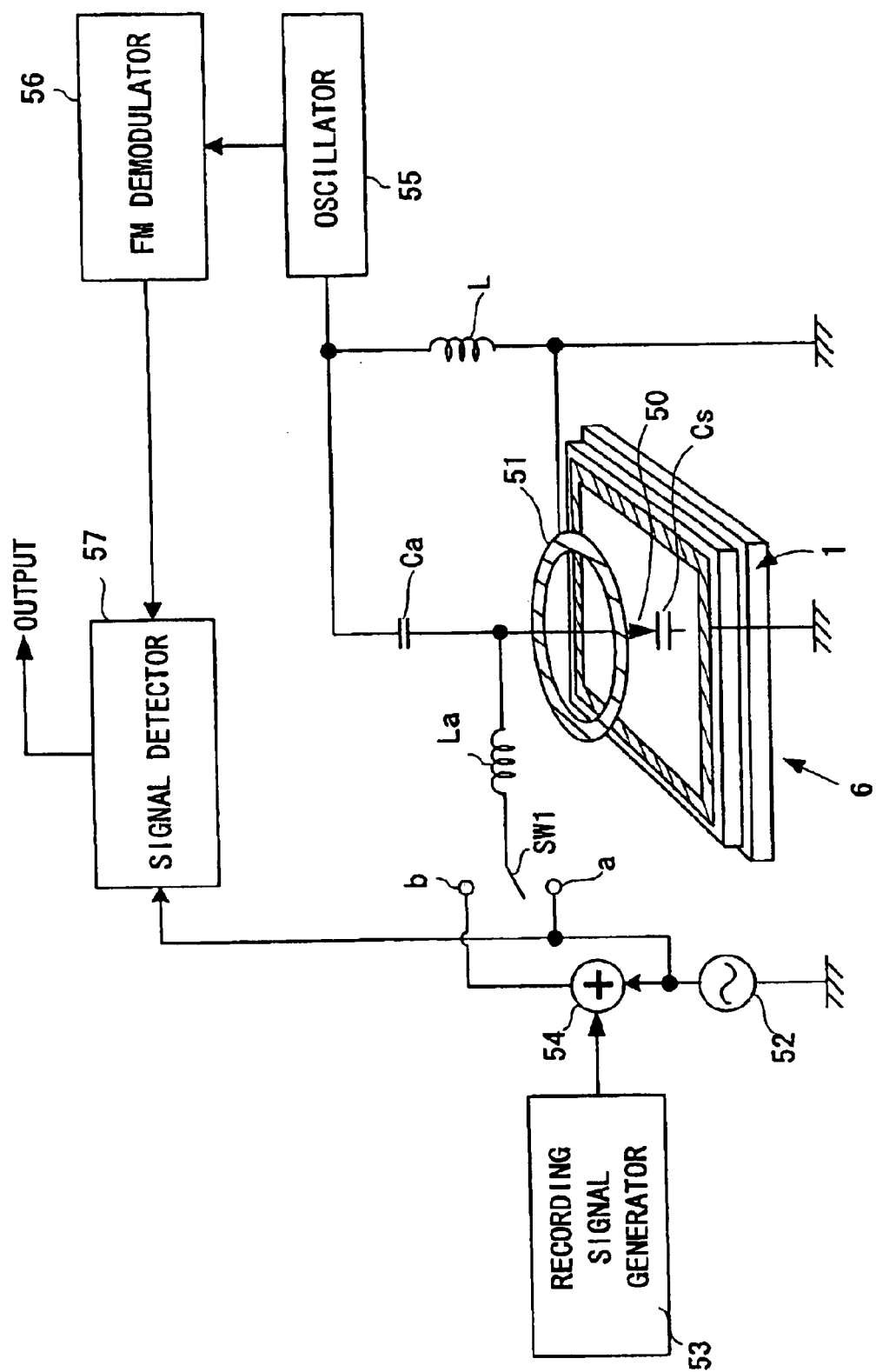
FIG. 12 is a schematic diagram showing one example of an information recording/reproducing apparatus using the dielectric recording medium associated with the present invention.

Embodiment of an Information Recording/Reproducing Apparatus Using the Dielectric Recording Medium of the Present Invention Next, an information recording/reproducing apparatus 6 using the dielectric recording medium of the present invention will be explained with reference to FIG. 12. FIG. 12 is a schematic diagram showing a block structure of the information recording/reproducing apparatus 6 using the dielectric recording medium 1.

As shown in FIG. 12, the information recording/reproducing apparatus 6 is provided with: the dielectric recording medium 1; a probe 50; an electrode 51; an AC (Alternating Current) signal generator 52; a recording signal generator 53; an adder 54; an oscillator 55; a FM (Frequency Modulation) demodulator 56; a signal detector 57; an inductor L; an inductor La; a capacitance Ca; a switch SW1. In addition, the apparatus 6 further has other devices for performing various general functions of recording and reproducing information.

The probe 50 is a member having a hemispherical tip with a predetermined radius. At least the surface of the probe 50 has conductivity to apply a voltage. When information is recorded, the voltage is applied to the probe 50 to form the polarization domain in the dielectric recording medium 1. On the other hand, when the recorded information is reproduced, the polarization domain is traced by the probe 50 to pick up the recorded information.

The electrode 51 is a return electrode for the high-frequency electric field that is generated by the oscillator 55 and applied to the microdomain of the dielectric recording medium 1 through the probe 50.

The AC signal generator 52 is a device for generating an AC signal which is applied to the probe 50. The AC signal generator 52 applies an alternating electric field to the microdomain of the dielectric substance and modulates reading signals at the time of reading information so as to ensure the separation of the reading signals. Moreover, the AC signal generator 52 biases a recording signal from the recording signal generator 53 and applies the biased recording signal to the probe 50 to record the information. The difference in a capacitance Cs just under the probe 50 corresponding to the polarization state causes the oscillation frequency of the oscillator 55 to be modulated. By demodulating this, it is possible to monitor whether an accurate recording operation is performed. When the information is read out, the SW1 is connected to the side of a terminal a. When the information is written, the SW1 is connected to the side of a terminal b.

The recording signal generator 53 converts information which is to be recorded in the dielectric recording medium 1 to a signal in the format appropriate for recording. The voltage level, the pulse width and the like thereof are also set optimally and are outputted.

The adder 54 adds the signal for recording from the recording signal generator 53 and the AC signal from the AC signal generator 52 to modulate and apply them to the probe 50.

The oscillator 55 generates a signal used for the readout of the recorded information by frequency modulation. The oscillation frequency is set to about 1 GHz, for example.

The inductor La and the capacitance Ca constitute a low-cut (LC) filter installed in order to prevent the AC signal of the AC signal generator 52 from interfering with the oscillator 55. The oscillation frequency of the oscillator 55 is on the order of 1 GHz, so that even if the AC signal of the AC signal generator 52 is on the order of MHz, it is substantially possible to separate them using the simple LC filter. Moreover, increasing the frequency is advantageous in view of data transfer rate, and in that case, a filter constant appropriate for the case may be selected.

The inductor L constitutes a resonance circuit with the capacitance Cs corresponding to the polarization domain just under the probe 50. The change of the capacitance Cs causes the change of the resonance frequency, resulting in frequency-modulating the oscillation signal of the oscillator 55. By demodulating this frequency-modulation, it is possible to read the recorded information. Here, although there is the capacitance Ca in the resonance circuit, since the capacitance Cs is extremely small as compared to the capacitance Ca, the capacitance Cs is a dominant factor with respect to the resonance frequency.

The FM demodulator 56 demodulates the oscillation signal of the oscillator 55, which is frequency-modulated by the resonance circuit constructed with the inductor L and the capacitance Cs. A typical FM detection device is used for this.

The signal detector 57 performs coherent (synchronous) detection on the signal demodulated with the FM demodulator 56, using the AC signal from the AC signal generator 52 as a synchronization signal, and reproduces the recorded information.

Next, the record operation of the information recording/reproducing apparatus 6 will be explained. The SW1 is connected to the terminal b. Firstly, information to be recorded is inputted to the recording signal generator 53. In the recording signal generator 53, the information to be recorded is converted into a predetermined format appropriate for recording and is outputted as a digital recording signal having the set voltage level and the set pulse width.

The recording signal from the recording signal generator 53 is applied to the probe 50 via the inductor La. Then, by the electric field generated between the probe 50 and the electric conductor 12 of the dielectric recording medium 1, the polarization domain is formed in a predetermined portion of the dielectric recording medium 1, resulting in recording the information.

Monitoring a recorded information is performed by frequency-modulating the oscillation frequency of the oscillator 55 using the resonance circuit of the inductor L and the capacitance Cs just under the probe 50 corresponding to the formed polarization domain, demodulating this frequency-modulated signal with the FM demodulator 56, and performing a coherent detection at the signal detector 57 with the AC signal of the AC signal generator 52 as the synchronization signal.

Next, the reproduction operation of the information recording/reproducing apparatus 6 will be explained. The SW1 is connected to the terminal a. To the probe 50, the AC signal is applied from the AC signal generator 52. This AC signal will be the synchronization signal in the coherent detection. When the probe 50 traces on the polarization domain, the capacitance Cs is detected. The oscillation frequency of the oscillator 55 is modulated by the resonance frequency of the resonance circuit constructed with the capacitance Cs and the inductor L. This frequency-modulated signal is demodulated in the FM demodulator 56, and the coherent detection is performed in the signal detector 57 with the AC signal of the AC signal generator 52 as the synchronization signal, resulting in reproducing the record information.

The signal picked up in this manner is reproduced with the AC signal of the AC signal generator 52 as the synchronization signal, and thus the recorded information is reproduced. Incidentally, with respect to a device used for the coherent detection, any device can be used if it is a device for reproducing a signal synchronously with the AC signal of the AC signal generator 52, such as a lock-in amplifier.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-086576 filed on Mar. 26, 2002 including the specification, claims, drawings and summary is incorporated herein by reference in its entirety.

What is claimed is:

1. A dielectric recording medium for recording information in a dielectric material, the dielectric recording medium comprising:

a substrate;

a dielectric material having a predetermined thickness and having a recording surface for recording the information thereon; and an electric conductor provided on at least a back surface of the dielectric material which is on the opposite side to the recording surface, wherein the back surface of the dielectric material on which the electric conductor is provided is bonded to a bonding surface of the substrate, and the electric conductor covers the back surface and a side surface of the dielectric material, and an edge portion of the electric conductor is located at a peripheral portion of the recording surface of the dielectric material.

2. The dielectric recording medium according to claim 1, wherein the electric conductor covers all of the side surfaces of the dielectric material, and the edge portion of the electric conductor surrounds the peripheral portion of the recording surface of the dielectric material.

3. The dielectric recording medium according to claim 1, wherein the substrate id a silicon substrate.

4. The dielectric recording medium according to claim 1, wherein a concave portion is provided on the bonding surface of the substrate.

5. The dielectric recording medium according to claim 1, wherein the electric conductor provided on the back surface of the dielectric material is bonded to the bonding surface of the substrate by using a resin adhesive.

6. The dielectric recording medium according to claim 1, wherein said dielectric material is a ferroelectric material.

7. The dielectric recording medium according to claim 1, wherein said dielectric material is $LiTaO_3$.

8. A dielectric recording medium for recording information in a dielectric material, the dielectric recording medium comprising:

a substrate;

a dielectric material having a predetermined thickness and having a recording surface for recording the information thereon; and an electric conductor provided on at least a back surface of the dielectric material which is on the opposite side to the recording surface, wherein the back surface of the dielectric material on which the electric conductor is provided is bonded to a bonding surface of the substrate, and the electric conductor comprising:

a first electric conductor portion located on the back surface of the dielectric material;

a second electric conductor portion located on a side surface of the dielectric material and connected with the first electric conductor portion; and a third electric conductor portion located at a peripheral portion of the recording surface of the dielectric material and connected with the second electric conductor portion.

9. The dielectric recording medium according to claim 8, wherein the second electric conductor portion covers all of the side surfaces of the dielectric material, and the third electric conductor portion surrounds the peripheral portion of the recording surface of the dielectric material.

10. The dielectric recording medium according to claim 8, wherein the substrate is a silicon substrate.

11. The dielectric recording medium according to claim 8, wherein a concave portion is provided on the bonding surface of the substrate.

12. The dielectric recording medium according to claim 8, wherein the electric conductor provided on the back surface of the dielectric material is bonded to the bonding surface of the substrate by using resin adhesive.

13. The dielectric recording medium according to claim 8, wherein said dielectric material is a ferroelectric material.

14. The dielectric recording medium according to claim 8, wherein said dielectric material is $LiTaO_3$.

* * * * *